May 29, 1934.  J. G. BROWN ET AL  1,960,692
APPARATUS FOR TREATING SEEDS
Filed Aug. 27, 1929  2 Sheets-Sheet 1

INVENTORS.
JAMES G. BROWN.
ROBERT B. STREETS.
BY
ATTORNEY.

May 29, 1934.  J. G. BROWN ET AL  1,960,692
APPARATUS FOR TREATING SEEDS
Filed Aug. 27, 1929   2 Sheets-Sheet 2
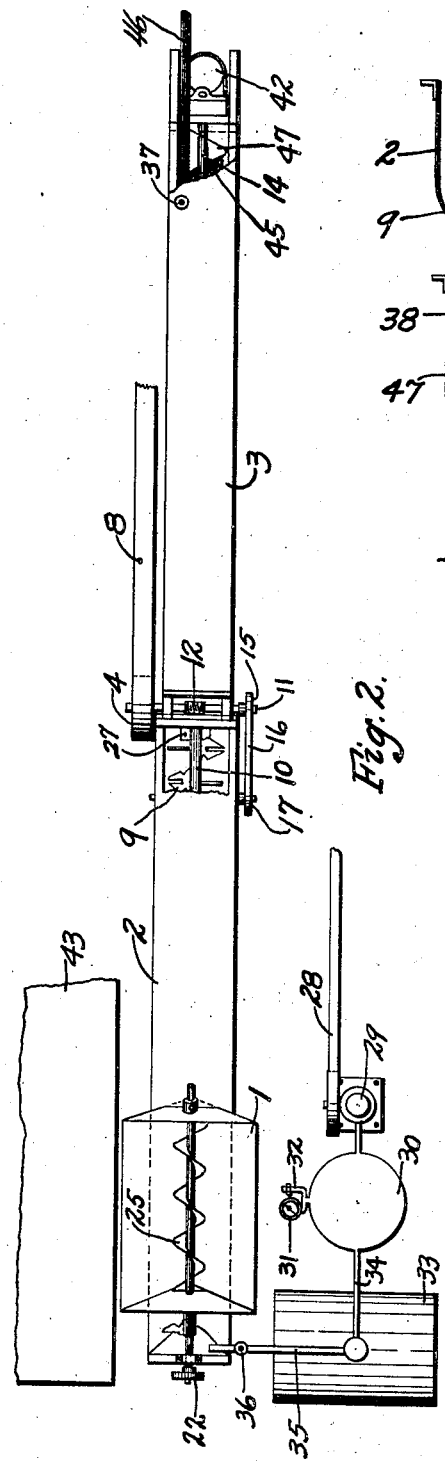
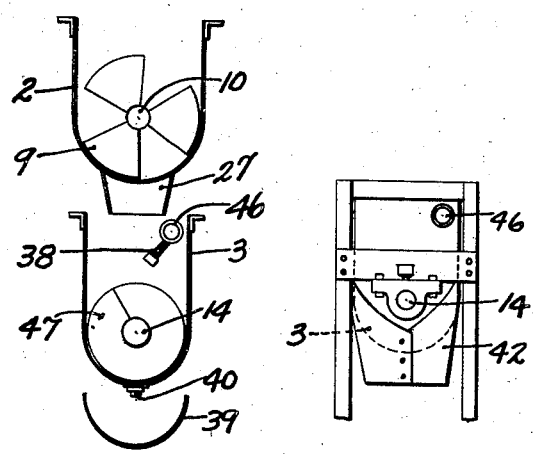
Fig. 5.   Fig. 7.
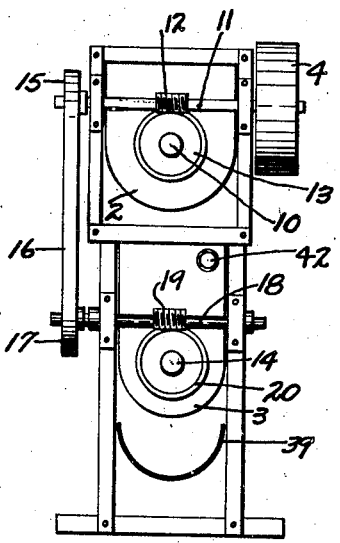
Fig. 6.
INVENTORS.
JAMES G. BROWN.
RUBERT B. STREETS.
BY
ATTORNEY Patented May 29, 1934

1,960,692

UNITED STATES PATENT OFFICE 1,960,692

APPARATUS FOR TREATING SEEDS

James G. Brown and Rubert B. Streets, Tucson, Ariz.

Application August 27, 1929, Serial No. 388,751

2 Claims. (Cl. 83—28)

This invention relates to improvements in a method of and machine for delinting cotton seed.

The object of the invention is to provide a simple, efficient, and automatic mechanism in which the seed are completely delinted by acid, all of the resultant residue and all traces of acid are removed and the delinted seed are deposited into sacks or any other containers desired.

In planting cotton, the use of delinted seed has many advantages among which are:

Elimination of angular leaf spot or "Black Arm", a bacterial disease which causes a seedling blight, poor stand, and injury to leaves, stems and bolls on mature plants. This disease is most serious during humid weather.

*Ease in planting.*—Delinted seeds are as smooth as beans, and do not stick together, therefore there is no tendency to clog the planter.

*Saving of seed.*—From one-half to one-third of the usual amount of untreated seed will give as good a stand where delinted seed is used. The saving in seed will equal or exceed the cost of delinting by the herein described apparatus.

More uniform stands are secured by using corn plates with the holes slightly enlarged to hold three to five seeds than by using the cotton plates in the same planter.

Quicker germination by two to seven days depending upon the soil temperature. This is very important on certain types of soil which crust or dry out rapidly, making it difficult to secure a uniform stand by the usual methods.

While the treating of cotton seed with acid for removing the lint is not new, the methods of handling have been more or less crude and expensive and the herein described method and apparatus was developed to make the delinting of large quantities of planting seed practical. The action of this apparatus is practically automatic, requiring only an attendant to place the seed in the feed hopper, to see that the right proportion of acid is maintained, to see that the washing is thorough and to remove the containers for the delinted seed, as they are filled.

The untreated seed is placed in a feed hopper from which it is uniformly fed into an inclined treating tank. Here it is met by and thoroughly mixed with acid. The mixing is accomplished by a series of paddles or a cut flight conveyor with intermediate mixing paddles, which serves the double purpose of wetting each seed with acid and moving the whole mass uniformly toward the discharge end of the tank.

About three or four inches of acid in the lower end of the treating tank is sufficient for delinting, and this level is maintained by regulating the stream of acid supplied so that it replaces the acid used up by the delinting process. The acid does not have to be touched or poured by hand, as it is carried to the point of use by air pressure. As the seed is carried up the incline of this tank toward the discharge end, all excess acid on the seed drains back to the lower end of the tank where the body of acid is maintained.

By the time the seed arrives at the discharge end of the tank, all of the lint has been acted upon by the acid.

Below the discharge end of the treating tank is placed the lower end of another inclined tank. The seed entering this tank are slowly carried to the upper end of this tank by a screw conveyor, and during the passage through this tank, the seed are thoroughly washed by a large number of jets of water, the removed material and the waste water passing out through perforations in the tank.

The thoroughly delinted and washed seed are discharged into a delivery hopper and thence into a sack or other container.

An object of the invention is to eliminate the necessity of pre-heating the cottonseed prior to delinting the same which endangers the life and vigor of the embryo plant.

Another object is the elimination of expensive and bulky tanks with acid solutions, settling tanks, filters and the like.

A further object is to prevent the waste of acid and the necessity of reclaiming the same.

Another object is to provide a machine that will empty itself at the end of a run and to which sufficient seed may be fed by hand to use up any acid remaining in the treating tank.

Still another object is to provide a machine that may be easily cleaned after use and one in which the various parts may be coated with oil or asphalt paint in order to prevent corrosion.

The invention is illustrated in the accompanying drawings in which like parts are indicated by the same numerals.

Fig. 2 is a top view of the apparatus with portions of the casing broken away to show the interior.

Fig. 5 is a section on the line B—B of Fig. 1.

Fig. 6 shows the arrangement of the main drive.

Fig. 7 is an elevation of the delivery hopper.

Figure 1:
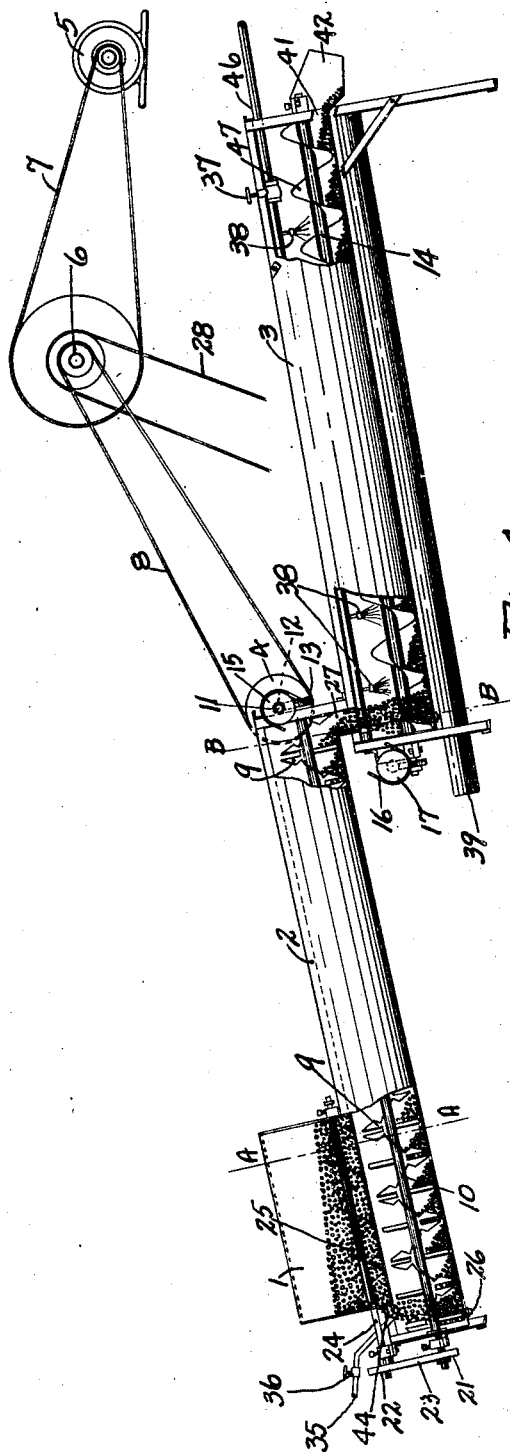
Fig. 1 is a side view of the apparatus with portions of the casings broken away to show the interior.
Figure 4:
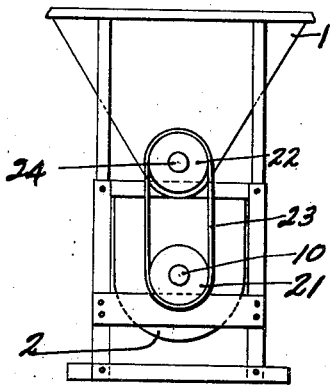
Fig. 4 is a view showing the arrangement of the feed hopper drive.
Figure 3:
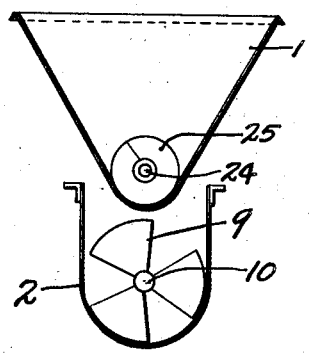
Fig. 3 is a section on the line A—A of Fig. 1.

Referring to the drawings, the numeral 1 denotes a feed hopper, 2 is a treating tank, and 3 a washing tank. The main drive pulley 4 receives its power from a motor or other means of power 5 either direct or through a countershaft 6, the belt 7 transmitting power to the countershaft and the belt 8 transmitting power to the pulley 4. The conveying-mixing paddles 9, in treating tank 2, are carried by a shaft 10. The main drive pulley 4 is fixed on shaft 11. The shaft 10 is driven at a reduced speed by means of a worm 12 on shaft 11 and a worm gear 13 on shaft 10.

The shaft 14 in the washing tank 3 carries a screw conveyor 47 and gets its power from shaft 11 through pulley 15, the belt 16, pulley 17, shaft 18, the worm 19 and the worm gear 20. On the lower end of the shaft 10, is the pulley 21 which drives the pulley 22 by means of the belt 23 (or a link belt and sprockets may be used), thereby rotating the shaft 24 which carries a screw conveyor 25 in the hopper 1. The opening 44 allows the seed to pass from hopper 1 to the treating tank 2.

The treating tank has a drain plug 26 in its lower end, and a discharge opening 27 in its upper end communicating with the lower end of the washing tank 3. The belt 28 drives an air compressor 29. An air tank 30 has a gage 31 and a pressure relief valve 32. The pipe 34 leads air under pressure to a drum of acid 33. The acid is fed into the treating tank through pipe 35 and the rate of flow is regulated by the valve 36.

A pipe 46 connected to a water supply has a number of jets or nozzles 38 longitudinally disposed within the washing tank 3 and the quantity of water used is regulated by the valve 37. The bottom of the washing tank is perforated so that the water and removed material may pass through to the semi-circular drain 39.

The washed seed pass out through the opening 41 into the delivery hopper 42.

It is very convenient to have a loading platform 43 adjacent to the feed hopper 1 facilitate the act of feeding seed into the machine.

The method of operation of the machine is as follows:

The seed is poured into the hopper 1 where they are uniformly fed by the screw conveyor 25 through the opening 44 where they fall into a body of acid in the lower end of tank 2. The series of paddles 9 on shaft 10 thoroughly mix the seed with the acid and at the same time convey the seed to the upper end of the tank. The acid is supplied by air pressure in the acid drum 33, the acid passing into the treating tank through pipe 35 and the rate of flow of the acid is controlled by the valve 36, so that the acid admitted just replaces the acid used up in the delinting process. The air pressure mentioned is furnished by the compressor 29 and the storage tank 30.

Three feet from where they enter the treating tank 2, the seed should show no dry white portions of lint. If they do, the supply of acids should be increased. Too wet a mixture shows an excess of acid and the amount should be decreased. By the time the seed arrive at the upper end of the tank 2 all of the lint is destroyed.

The seed then pass through the opening 27 into the washing tank 3 and are passed through this tank by the screw conveyor 47. The water is led into the machine by the pipe 46 and is applied to the seed through a series of jets 38. The screw conveyor in moving the seed along breaks the seed up into small groups, making the washing very effective. The water and mixture of dissolved lint and strong acid washed from the surface of the treated seed passes through the perforated lower portion 45 of the washing tank into the trough 39 whence it may be lead away from the machine.

A short length of the washing tank near its upper end has no water jets and the seed, passing through this portion, have a chance to get rid of some of the water by drainage.

The completely delinted seed pass from the washing tank 3, through opening 41 into the delivery hopper 42. A sack or some kind of container is placed below opening in hopper 42 to receive the seed.

In some cases where convenient gravity or a siphon may be used instead of air pressure for feeding the acid into the treating tank.

It will be observed that the acid is removed from the seed by reason of the washing process carried out in tank 3. This may be readily determined by the operator by touching one of the wet seeds to his tongue. If any appreciable amount of acid remains on the seed coat, it can be readily detected by taste and the water supply regulated accordingly.

And while the method and apparatus or machine are described as applied to delinting cotton seed, it is obvious these may be employed to delint or treat other seeds, or, to merely treat seeds to remove fungus bacteria or the like.

Instead of a suitable acid, any chemical may be used in treating the seed, depending upon the results required.

What is claimed is:

1. In an apparatus for treating cotton seed in a continuous process, the combination of a hopper having an outlet, a conveyor in the hopper adapted to deliver seed to said outlet at a uniform rate, a driving shaft for said conveyor, an inclined treating tank having an inlet at its lower end communicating with the outlet of the hopper, means for delivering acid into said inlet, a conveyor in the treating tank adapted to mix the seed with the acid and to move the seed up the incline to an outlet at the upper end thereof, a drying shaft for said last conveyor, an inclined washing tank having an inlet at its lower end communicating with the outlet of the treating tank, a discharge outlet in the upper end of the washing tank, a conveyor adapted to move seed through the washing tank and deliver the same to the discharge outlet, a driving shaft for said last conveyor, and means for driving all said shafts to effect said process.

2. In an apparatus for treating cotton seed in a continuous process, the combination of a hopper having an outlet, a conveyor in the hopper adapted to deliver seed to said outlet at a uniform rate, a driving shaft for said conveyor, an inclined treating tank having an inlet at its lower end communicating with the outlet of the hopper, means for delivering acid into said inlet, a conveyor in the treating tank adapted to move the seed up the incline to an outlet at the upper end thereof active acid from treated seed draining down the incline against the upward motion of the seed, a driving shaft for said last conveyor, an inclined washing tank having an inlet at its lower end communicating with the outlet of the treating tank, a discharge outlet in the upper end of the washing tank, a water spray extending more than half the length of the washing tank the unsprayed length being provided to allow water to drain from the seed after being washed, a conveyor adapted to move the seed through said last tank to effect the washing and draining, a drive shaft for said last conveyor, and means for driving all of said shafts to cause all parts of said apparatus to operate coincidentally.

JAMES G. BROWN.
RUBERT B. STREETS.

CERTIFICATE OF CORRECTION.

Patent No. 1,960,692.　　　　　　　　　　　　　　May 29, 1934.

JAMES G. BROWN, ET AL.

It is hereby certified that error appears in the printed specification of the above numbered patent requiring correction as follows: Page 2, line 114, claim 1, for the word "drying" read driving; and that the said Letters Patent should be read with this correction therein that the same may conform to the record of the case in the Patent Office.

Signed and sealed this 1st day of December, A. D. 1936.

Henry Van Arsdale (Seal)　　　　　　　　　　　　　　　　Acting Commissioner of Patents.